United States Patent
Bordogna et al.

(10) Patent No.: US 11,265,096 B2
(45) Date of Patent: Mar. 1, 2022

(54) HIGH ACCURACY TIME STAMPING FOR MULTI-LANE PORTS

(71) Applicant: Intel Corporation, Santa Clara, CA (US)

(72) Inventors: Mark Bordogna, Andover, MA (US); Janardhan Satyanarayana, Allentown, PA (US); Yoni Landau, Or-Aqiva (IL); Diwakar Suvvari, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/410,275

(22) Filed: May 13, 2019

(65) Prior Publication Data
US 2019/0273571 A1    Sep. 5, 2019

(51) Int. Cl.
*H04J 3/07* (2006.01)
*H04J 3/06* (2006.01)
*H04L 1/00* (2006.01)
*H04L 43/106* (2022.01)

(52) U.S. Cl.
CPC ........... *H04J 3/073* (2013.01); *H04J 3/0661* (2013.01); *H04J 3/0682* (2013.01); *H04J 3/0697* (2013.01); *H04L 1/0046* (2013.01); *H04L 1/0057* (2013.01); *H04L 1/0067* (2013.01); *H04L 43/106* (2013.01)

(58) Field of Classification Search
CPC ...... H04L 43/106; H04J 3/0661; H04J 3/0697
See application file for complete search history.

(56) References Cited

U.S. PATENT DOCUMENTS

| | | | |
|---|---|---|---|
| 8,761,209 B1 | 6/2014 | Brown et al. | |
| 9,197,531 B1 * | 11/2015 | Mendel | H04L 43/106 |
| 9,203,770 B2 | 12/2015 | Soffer et al. | |
| 9,235,540 B1 | 1/2016 | Langhammer et al. | |
| 10,069,660 B1 | 9/2018 | Sun et al. | |
| 2004/0062278 A1 * | 4/2004 | Hadzic | H04L 29/06 370/503 |
| 2008/0019398 A1 | 1/2008 | Genossar et al. | |

(Continued)

FOREIGN PATENT DOCUMENTS

WO    2018186876 A1    10/2018

OTHER PUBLICATIONS

IEEE 802.3-2018, "IEEE Standard for Ethernet", Aug. 31, 2018, (Year: 2018).*

(Continued)

*Primary Examiner* — James P Duffy
(74) *Attorney, Agent, or Firm* — Compass IP Law PC

(57) ABSTRACT

In a transceiver, the accuracy of a packet time stamp can be improved by compensating for errors introduced by processing of the packet. A received packet can be received via multiple lanes. A packet time stamp can be measured using a start of frame delimiter (SFD). A last arriving lane can be used to provide a recovered clock signal. A phase offset between the recovered clock signal and the system clock of the transceiver can be used to adjust the time stamp. A position of the SFD within a data block can be used to adjust the time stamp. A position of the data block within a combined group of data blocks can be used to adjust the time stamp. Also, a serializer-deserializer delay associated with the last arriving lane can be used to adjust the time stamp.

20 Claims, 13 Drawing Sheets

(56) References Cited

U.S. PATENT DOCUMENTS

| | | |
|---|---|---|
| 2008/0144624 A1 | 6/2008 | Marcondes et al. |
| 2010/0172647 A1 | 7/2010 | Luo et al. |
| 2011/0188565 A1 | 8/2011 | Lawson |
| 2012/0221882 A1 | 8/2012 | Morrison et al. |
| 2014/0092918 A1 | 4/2014 | Jost |
| 2014/0269769 A1 | 9/2014 | Gresham et al. |
| 2015/0055644 A1 | 2/2015 | Bordogna et al. |
| 2015/0103850 A1 | 4/2015 | Wang et al. |
| 2015/0106668 A1 | 4/2015 | Ran |
| 2016/0134392 A1 | 5/2016 | Effenberger et al. |
| 2016/0241462 A1 | 8/2016 | Wang et al. |
| 2016/0337114 A1 | 11/2016 | Baden et al. |
| 2016/0352500 A1 | 12/2016 | Benjamini et al. |
| 2017/0041126 A1 | 2/2017 | Bergeron |
| 2017/0093757 A1 | 3/2017 | Gareau et al. |
| 2017/0331592 A1 | 11/2017 | Matsushita et al. |
| 2018/0041332 A1 | 2/2018 | Fang et al. |
| 2018/0191802 A1 | 7/2018 | Fang et al. |
| 2019/0044650 A1 | 2/2019 | Khan |
| 2019/0044839 A1 | 2/2019 | Landau et al. |
| 2019/0097748 A1 | 3/2019 | Loprieno et al. |
| 2019/0132185 A1 | 5/2019 | Farhoodfar et al. |
| 2019/0273571 A1 | 9/2019 | Bordogna et al. |
| 2020/0021313 A1 | 1/2020 | Lu |
| 2020/0259578 A1 | 8/2020 | He et al. |
| 2020/0328767 A1 | 10/2020 | Zhong et al. |

OTHER PUBLICATIONS

IEEE P802.3cd™/D3.1, Draft Standard for Ethernet, "Amendment 3: Media Access Control Parameters for 50 Gb/s and Physical Layers and Management Parameters for 50 Gb/s,100 Gb/s, and 200 Gb/s Operation", Sponsor LAN/MAN Standards Committee of the IEEE Computer Society, Feb. 7, 2018, The Institute of Electrical and Electronics Engineers, Inc., New York, USA, 409 pages.

IEEE Standard for Ethernet, "Corrigendum 1: Multi-lane Timestamping", IEEE Std 802.3™-2015/Cor Jan. 2017, Sponsor LAN/MAN Standards Committee of the IEEE Computer Society, IEEE-SA Standards Board, New York, USA, Mar. 23, 2017, 16 pages.

International Telecommunication Union, Telecommunication Standardization Sector, Study Period 2013-2016, COM 15-LS 226-E, San Jose, Mar. 2-6, 2015, 4 pages.

International Telecommunication Union, Telecommunication Standardization Sector, Study Period 2017-2020, SG15-LS72 Study Group 15, Auckland, Oct. 9-13, 2017, 3 pages.

Extended European Search Report for Patent Application No. 20165323.5, dated Oct. 9, 2020, 11 pages.

Office Action for U.S. Appl. No. 15/941,854, dated Mar. 2, 2021, 18 pages.

25G & 50G Specification, 25 and 50G Ethernet Consortium, dated Jun. 14, 2016.

Aliaga, Ramon J., et al., "PET System Synchronization and Timing Resolution Using High-Speed Data Links," 2011, IEEE Transactions on Nuclear Science, vol. 58, Issue 4, pp. 1596-1605.

IEEE Standard for Ethernet, Section Four, 2016, 2282 pages.

IEEE Std 802.3-2015, approved Sep. 3, 2015, by the IEEE-SA Standards Board.

IEEE Std 802.3by-2016, approved Jun. 30, 2016, by the IEEE-SA Standards Board.

Liaison to IEEE802.1 concerning the impact on timing performance due to Ethernet PHY, Liaison statement, International Telecommunication Union, Oct. 2017, 3 pages.

PCT Search Report and Written Opinion prepared for PCT/US2017/026504, completed 2017-10-25.

* cited by examiner

912

ADJUST TIME STAMP BASED ON PHASE OFFSET BETWEEN THE
RECOVERED CLOCK SIGNAL AND A SYSTEM CLOCK SIGNAL
914

ADJUST TIME STAMP BASED ON POSITION OF PACKET TIME
SYMBOL WITHIN A BLOCK
916

ADJUST TIME STAMP BASED ON POSITION OF BLOCK WITH THE
PACKET TIME SYMBOL WITHIN A A GROUP OF BLOCKS
918

ADJUST TIME STAMP BASED ON SERDES DELAY ASSOCIATED WITH
LAST ARRIVING LANE
920

FIG. 9B

HIGH ACCURACY TIME STAMPING FOR MULTI-LANE PORTS

RELATED APPLICATIONS

The present application is related to "TECHNOLOGIES FOR HIGH-PRECISION TIME STAMPING OF PACKETS," inventors Southworth et al, filed Apr. 7, 2017, publication WO2018/186876.

The present application is related to "TECHNOLOGIES FOR TIME STAMPING WITH ERROR CORRECTION," inventors Landau et al., filed Mar. 30, 2018, publication number US-2019-0044839-A1.

TECHNICAL FIELD

Various examples described herein relate to techniques for setting time stamps of transmitted or received packets.

BACKGROUND

Determination of a time stamp at which a packet is received or transmitted using a network interface is important in many applications. For example, determination of a time of transmission and time of arrival of a packet may be used to synchronize a time of day counter between the transmitting and receiving compute devices, which may be necessary for time-sensitive applications such as certain wireless communication protocols.

However, a time stamp of when a packet is transmitted or received may have several sources of inaccuracy. For example, a packet may be scrambled, requiring descrambling before a pattern can be recognized for time stamping, or the packet may be transferred between domains with asynchronous clocks as compared to the clock used for time stamping, both of which may contribute to the inaccuracy in time stamping when a packet actually arrives at a device.

BRIEF DESCRIPTION OF THE DRAWINGS

FIGS. 9A and 9B depict an example process.

DETAILED DESCRIPTION

Figure 1:
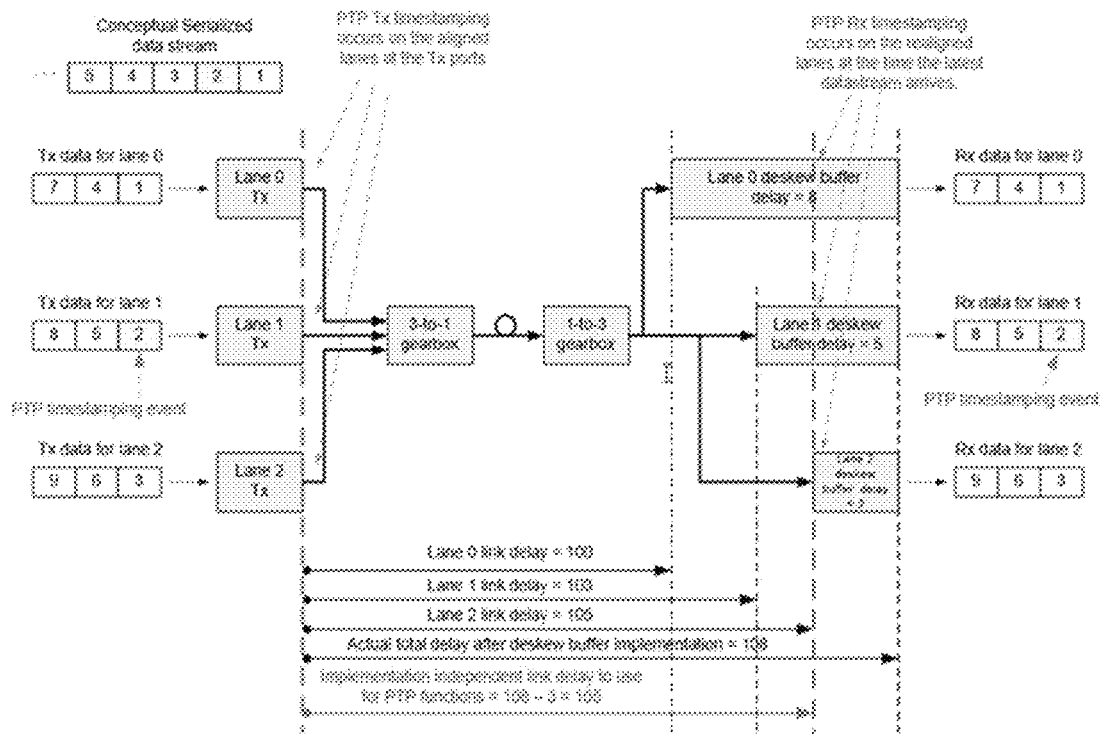
FIG. 1 depicts an example of a transmit and receive system.

For a received packet, a highly accurate time stamp of when a packet is received at the physical network interface may be needed. In some environments, nanosecond and sub-nanosecond time stamping is required. Nanosecond accurate time stamps allow network timing applications such as IEEE 1588 applications to recover a frequency and phase at a receive node that is very accurate relative to the grandmaster timing. For example, Precision Time Protocol (PTP) is a protocol used to synchronize clocks throughout a computer network. For example, nanosecond accurate time stamp precision is needed in financial trading and wireless base stations. For example, in 5G cellular designs, a precise time of when a signal leaves an antenna can be used to make a network more efficient and reduce opportunities for faulty handovers from one antenna to another.

Multi-lane ports that provide aggregate transmission or receive rates over multiple lanes, such as 100 Gbps (e.g., 4 lanes of 25 Gbps), 50 Gbps (e.g., 2 lanes of 25 Gbps), and 40 Gbps (4 lanes of 10 Gbps), add additional complexity to achieving desired time stamp accuracy due to alignment marker/codeword insertion over many links. For four links, an alignment marker is sent for each link. In the 100 Gbps Ethernet case, the number of alignment markers can be up to 20 over 4 links where 20 alignment markers of 66 bits each are remapped to 1280 bits plus a 5-bit pad for a total of 1285 bits, which is the same length of five 257-bit blocks.

De-skew buffers are used to support alignment over parallel lanes using alignment markers. A lane associated with a longest path is used as a reference for aligning lanes.

With multi-lane Ethernet ports of 50 Gbps and 100 Gbps, Reed Solomon Forward Error Correction (RS-FEC) is used. However, RS-FEC can add a large variation in both the transmit and receive time stamping paths. Time stamping designs must account for the RS-FEC delay variations and de-skew variations in order to meet accuracy levels for 5G networks. This is mentioned in a liaison from ITU to IEEE 802.3 (e.g., ITU SG15 LS72 to IEEE 802.3 and ITU SG15 LS226 to IEEE 802.3).

For example, time stamp error sources when dealing with the multi-lane Ethernet with RS-FEC include: alignment marker (AM)/codeword marker (CWM) insertion (at transmit) and removal (at receive) over multiple parallel links; FEC transcoding from 66 bit blocks to 257 bit blocks; de-skew buffer alignment with minimal variability; and inherent error with the specific lane that carries the SFD. For inherent error with the specific lane that carries the SFD, even after the de-skew compensation, there are specific errors associated with the SFD lane such as PCS alignment errors and phase alignment errors that can cause multiple nanosecond inaccuracy in the time stamp. In addition, errors tracking the SFD lane can vary (e.g., for 4 lane 40 Gbps, SFD can appear on any of the 4 lanes for each PTP packet).

Various embodiments can improve the accuracy of a determined time stamp by accounting for delays associated with various signal manipulations. Various embodiments can measure delay associated with a deskew buffer until the point when the packet can be decoded to determine the start of frame delimiter (SFD) occurs and adjust the determined time stamp of a received packet to approximately account for at least some of the delays. Various embodiments can adjust the time stamp based on a phase offset between the clock domain of a network interface and a recovered clock signal from a signal received on a last arriving lane (LAL) that conveys a part of a packet. Various embodiments can further adjust the time stamp to account for a position of an SFD in a block. Various embodiments can further adjust the time stamp to account for a position of an SFD in a block after multiple blocks are output in parallel. Various embodiments can further adjust the time stamp to account for lane delay for the last arriving lane.

In connection with determination of the phase offset between the clock domain of a network interface and a recovered clock signal, various embodiments can reduce the number of phase measurement devices (e.g., measuring phase between the SERDES clock and the time stamping clock) used. For example, for a multi-lane network interface, in known applications, a phase measurement device per lane is used and these can use up large amounts of silicon area for multiple lanes. Various embodiments provide for a single phase measurement device and use of the slowest lane (e.g., last arriving lane (LAL)) for phase measurement. This can reduce the number of phase measurement devices for four lanes by a factor of 4 but also allow the implementation of single-lane and multi-lane network interfaces seamless.

FIG. 1 depicts transmit and receive time stamping points, as defined by 802.3-2018 clause 90.4.1.1. At the receive side, IEEE 802.3-2018 says to measure a time stamp at a media independent interface (MII). A physical layer interface (PHY) has auto negotiation layer (AN), physical medium dependent (PMD) layer, physical medium attachment (PMA) layer, RS-FEC layer, physical coding sublayer (PCS) before a time stamp is measured at an xMII. Accordingly, delays from many layers of PHY may be accounted for in determining the receive time stamp.

Figure 2A:
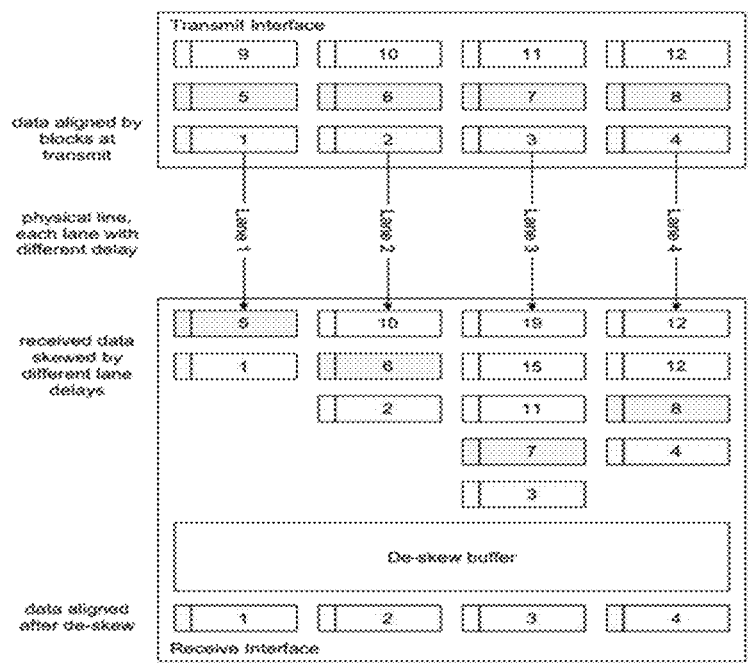
FIG. 2A depicts an example of variable delay across lanes.

FIG. 2A depicts an example of variable delay across lanes. The example is reproduced from ITU SG15 LS226 to IEEE 802.3. In this example, four lanes are used to transmit portions of a packet. At transmit, the block are aligned. But as each lane experiences a different delay, the blocks can arrive at the receiver at different times. A deskew buffer is used at the receiver to re-align the blocks.

Figure 2B:
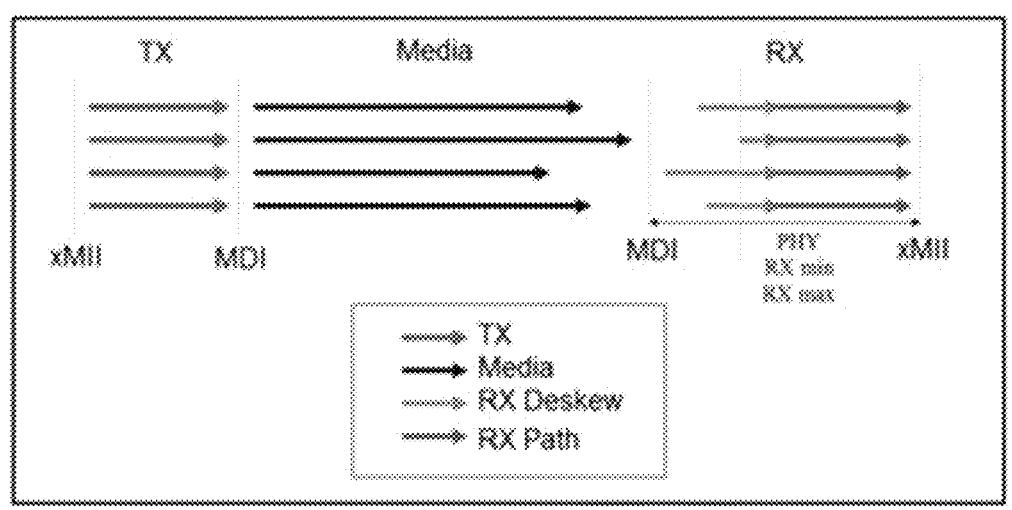
FIG. 2B shows a manner by which the multilane issue was resolved.

FIG. 2B depicts a manner by which the multilane issue was resolved. The largest physical medium delay across all the lanes is used as the physical medium delay for every lane. The de-skew delay of lanes with smaller physical medium delays is reallocated to the lane's corresponding physical medium delay. The result is all the lanes have an equal physical medium delay and where a time stamp event would occur at the same time. In this example, the last arriving lane is the second to bottom. A marker is used to align lanes and when to reassemble a packet from content received on lanes.

Note that the time stamping is done on the parallel lanes and not on a serialized version of the parallel lanes. The arrival time stamp measurement plane is after the de-skew, where all the lanes have already been realigned. However, because the reference plane is at the Medium dependent interface (MDI), the delay (ingress delay) between the MDI and the time stamp measurement plane, which may be implementation-dependent, may be known or measured for use to correct a time stamp.

Figure 3:
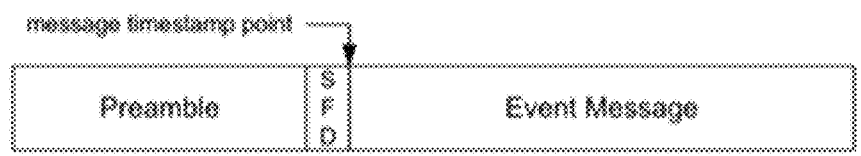
FIG. 3 depicts an example of a start of frame delimiter (SFD).

FIG. 3 depicts an example of an SFD. For example, IEEE 802.3-2018 defines an Ethernet frame that includes a preamble and start frame delimiter (SFD). The SFD can be one-octet in length. The SFD marks the end of the preamble and indicates the beginning of the Ethernet frame. An Ethernet frame includes with an Ethernet header, which contains destination and source MAC addresses. The middle section of the frame is payload data including any headers for other protocols (for example, Internet Protocol) carried in the frame. The frame ends with a frame check sequence (FCS). However, in addition, or alternatively, techniques can be applied to other frame or packet types can be used such as but not limited to User Datagram Protocol (UDP), Transmission Control Protocol (TCP), and so forth.

Figure 4:
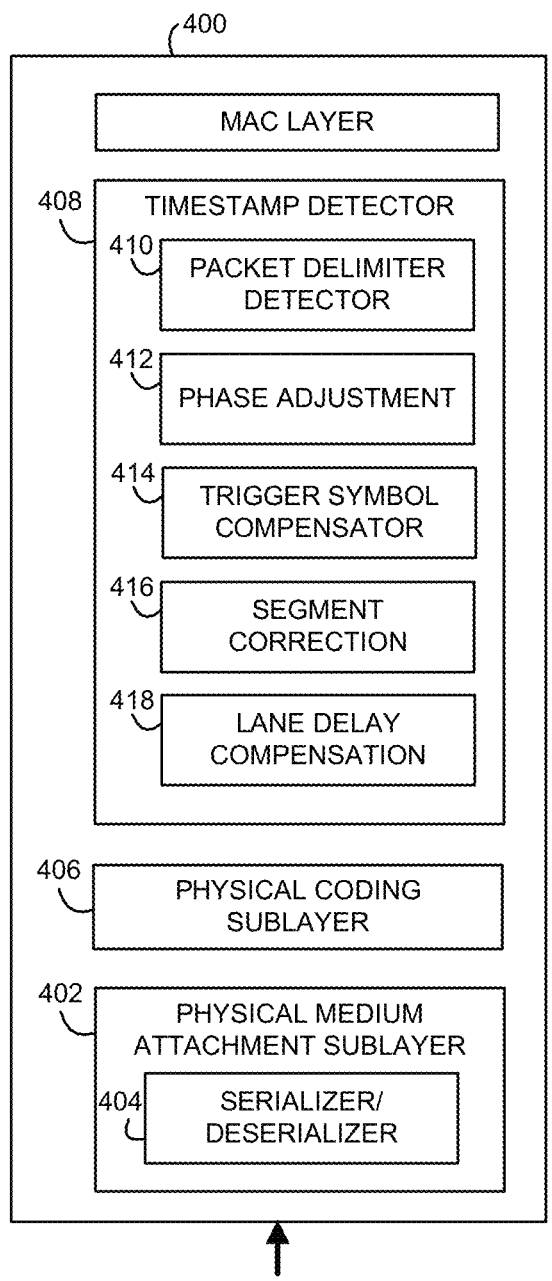
FIG. 4 depicts an example of a system.

FIG. 4 depicts an example of a system. System 400 can be used in a network interface, fabric interface, storage network interface, interface to an interconnect, bus interface, any technology that receives and/or transmits packets or signals and determines time stamps, and so forth. In some examples, multiple instances or replicas of portions of system 400 can be used to receive signals from multiple lanes, where an instance of a portion of system 400 receives and processes signals received on a particular lane. One or multiple lanes of signals can be received by one or more replicas of portions of system 400. For example, an instance of PMA sublayer 402 and PCS sublayer 406 can be used for a lane. The one or multiple lanes can provide portions of a packet whereby a packet is striped or distributed across lanes and transmitted. For example, an Ethernet frame can be striped across lanes and transmitted. In some examples, 66 bit blocks are transmitted on various lanes. Accordingly, packet content such as a header, an SFD, or payload can be distributed across 66 bit blocks among various lanes.

Physical medium attachment sublayer 402 can sample an incoming signal from a physical medium and provide a signal, such as a serial electrical signal at standardized voltage levels. Physical medium attachment sublayer 402 may operate at any suitable rate or bandwidth, such 10 gigabits per second (Gbps), 25 Gbps, 40 Gbps, 100 Gbps, or higher or lower than those rates. Physical medium attachment sublayer 402 can also be configured to send outgoing signals received from other components of the network interface controller to the physical medium to which it is attached. The physical medium can be one or more of an electrical signal conductor, optical signal conductor, or wireless medium. Physical medium attachment sublayer 402 uses a serializer/deserializer (SerDes) 404 to convert a serial signal to a parallel signal and/or convert a parallel signal to one or more serial signals. In some examples, SerDes 404 deserializes incoming signals from the physical medium for use by physical medium attachment sublayer 402 and serializes signals from the physical medium attachment sublayer 402 to be sent on the physical medium. SerDes 404 may translate between a serial interface and parallel interface of any suitable bit size, such as 16, 40, 66 bits, or other sizes. In some examples, a gearbox can be used to translate a first bit width to/from a second bit width.

Physical coding sublayer 406 is configured to perform coding on the incoming and outgoing signals. In some embodiments, physical coding sublayer 406 can perform a 64b/66b encoding to decode 66 bits to 64 bits or to encode 64 bits to 66 bits using the 64b/66b encoding algorithm described in IEEE Std 802.3-2018. Physical coding sublayer 208 can take 64 bits of outgoing data, add 2 bits as a synchronization header, and then scramble the 64 bits. In some embodiments, the physical coding sublayer 406 can perform additional or alternative encoding/decoding, such as 4b/5b encoding/decoding, 8b/10b encoding/decoding, or other encoding/decoding.

Time stamp detector 408 can determine a time stamp associated with a received or transmitted packet and compensate for at least some sources of inaccuracies in time stamping. For example, an adjusted time stamp can be determined for a received Ethernet frame. In other examples, an adjusted time stamp can be determined for a transmit time of an Ethernet frame. Adjustment to a time stamp can be made for timing errors arising from one or more of: phase offset between the recovered clock signal and a system clock signal, packet start indicator position within a block of data, packet start position within a multi-block segment, or serializer/de-serializer time delay. The determined packet time stamp can be used for a variety of uses including, but not limited to 5G antenna hand over, financial transaction timing stamping, and clock synchronization.

Packet delimiter detector 410 can identify a trigger pattern or packet delimiter. For example, the trigger pattern or packet delimiter can be an SFD. A time stamp for the packet can be based on a counter value of when the trigger pattern or packet delimiter was detected. Various adjustments can be made to the time stamp. Phase adjustment 412 can adjust the time stamp based on a phase offset between the clock domain used by system 400 and a recovered clock signal from a signal received on a last arriving lane (LAL). As is described in more detail later, the last arriving lane is a lane that provides a stripe or portion of a packet that arrives last at the receiver relative to other lanes that provide other stripes or portion(s) of the packet. For example, multiple copies of PMA sublayer 402 can receive different lanes. A last arriving lane can be determined based on receipt of a marker. For example, a copy of PMA sublayer 402 that receives the last arriving lane can determine a clock signal based on a frequency of the received signal on the last arriving lane. A phase offset between the recovered clock signal associated with the last arriving lane and the system clock can be used to adjust the determined time stamp value. Accordingly, phase adjustment 412 can compensate for lane delay associated with a SerDes.

Trigger symbol compensator 414 can adjust the time stamp to account for a position of a trigger pattern or packet delimiter in a block. For example, trigger symbol compensator 414 can adjust the time stamp to account for a position of an SFD in a 66 bit block. The SFD can be located at the beginning, middle or end of a 66 bit block but the time stamp is associated with detection of the SFD irrespective of position in a block. Trigger symbol compensator 414 can adjust the time stamp to account for the position of an SFD in a 66 bit block.

Segment correction 416 can adjust the time stamp to account for a position of an SFD in a block after multiple blocks are output in parallel. For example, a 66 bit block can convey an SFD and four 66 bit blocks can be combined and provided as an output to a 264 bit bus. Segment correction 416 can correct the time stamp to account for a position of the SFD in a larger 264 bit output. For example, a lane on which an SFD was received can be tracked. If there are 4 lanes, a 2 bit lane tracker can be used to indicate a block within multiple blocks.

Lane delay compensation 418 can adjust the time stamp to account for lane delay for the last arriving lane. The last arriving lane can be used to convey a recovered clock signal. There can be lane specific delays. For example, if the LAL is lane 1 that is used for timestamping, this lane has no or minimal delay from the deskew buffer. If the SFD is on lane 2, lane 2 may have some specific delays that are different than those of lane 1. One example is the 0-65 bit PCS delay register discussed later. A manufacturer of the PMA and PCS can provide data that indicate relative delay introduced by a PMA sublayer devices and PCS sublayer devices.

A media access control (MAC) layer and other packet processing layers can be used to process the packets.

Figure 5:
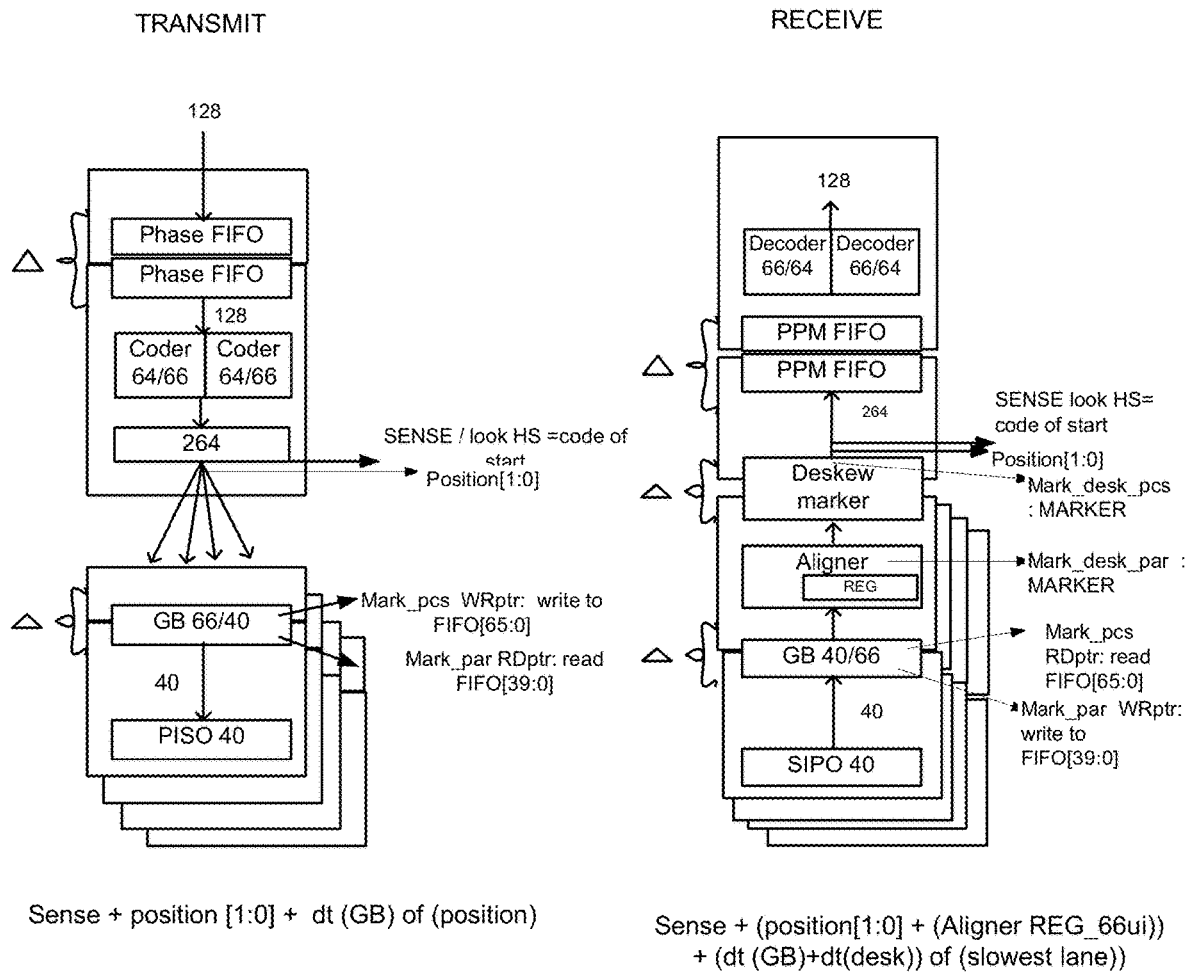
FIG. 5 depicts an example of a system.

FIG. 5 depicts an example of a system. The system can be used for a 4 lane 40 Gbps system, or other speeds of data transmission or receipt. In the transmit direction, the alignment markers are inserted as part of the phase first in first out (FIFO) and therefore when time stamping is done, there is no variability in the data. In the transmit direction, the time stamp capture occurs at a SENSE point just before the 264 to 257-bit conversion.

At the receiver, the data is deserialized to a bus of the physical medium attachment (PMA) domain using a deserializer. The data is transferred from the PMA domain associated with a PMA clock to a physical coding sublayer (PCS) domain associated with a PCS clock using a gearbox (GB). For example, in the PMA domain, a bus width of 40 bits is used but in the PCS domain, a bus width of 66 bits is used. The gearbox converts from a bus width of 40 bits to a bus width of 66 bits. In the receive direction, the time stamp SENSE point is provided just after the 257 to 264 bit conversion. In the receive direction, the alignment marker is removed as part of the PPM FIFO. Consequently, this does not cause any gap in the data as time stamping has already been done. As part of the 64/66b encoding block, the start of frame delimiter (SFD) can be obtained. The SENSE point represents a time when an SFD is detected on a particular lane out of the 4 lanes. A 2-bit position field can change on a per-packet basis and carries the position of the SFD out of the 4 lanes. The received 66-bit word from the deserializer is word aligned and therefore the received word needs to be shifted anywhere from 0-65 bits. The REG_66ui alignment register carries the shift information. This value is fixed once reset is released but can change with every reset. The dt(GB) represents the delay through the gearbox (GB). This delay can vary with each reset but is fixed once reset is released. This delay is estimated using a phase measurement technique described with respect to FIG. 8, for example. The dt(desk) represents the delay through the Reed Solomon gearbox and measured using a phase measurement technique described with respect to FIG. 8 as well.

Figure 6:
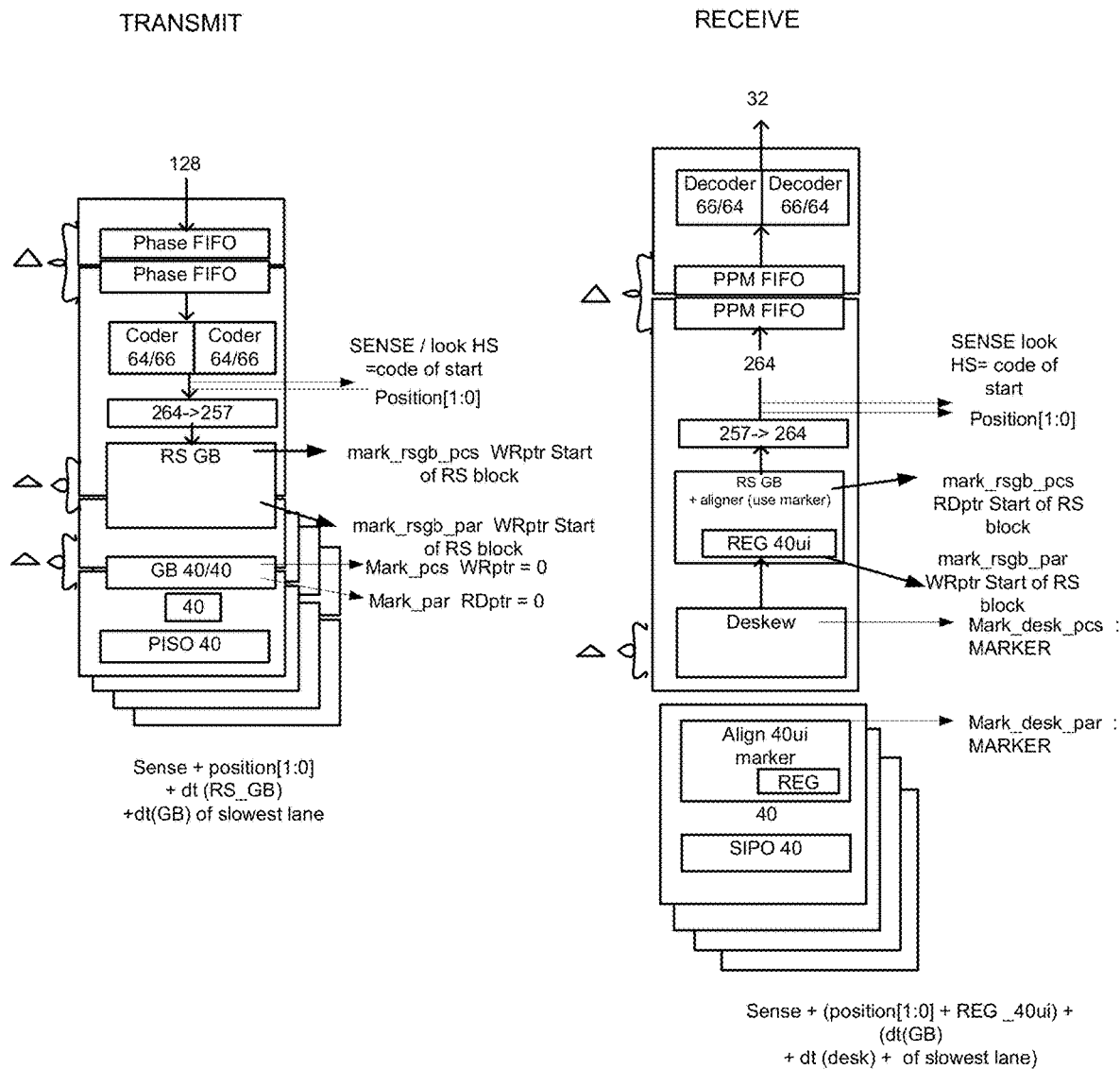
FIG. 6 depicts an example of a system.

FIG. 6 depicts an example of a system. The system can be for a 4 lane 100 Gbps system. The operation is similar as to that of the system of FIG. 5 except for higher bandwidth.

Figure 7:
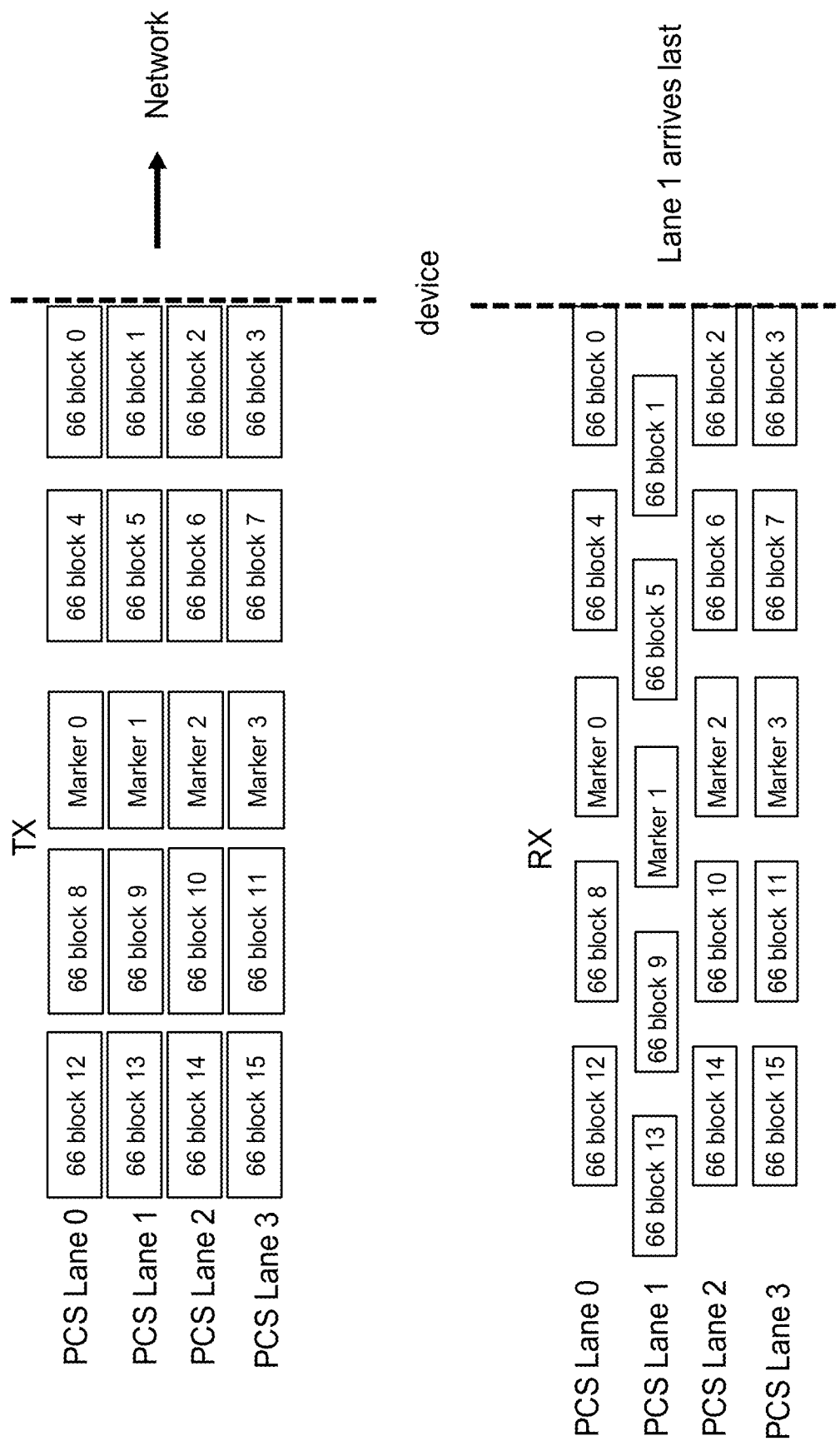
FIG. 7 depicts an example of multiple lane transmission and receipt.

FIG. 7 depicts an example of multiple lane transmission and receipt. In this example, lanes 0-3 are transmitted. At transmit (TX), block0-block3 ready to transmit and aligned. For example, 66 bit blocks are transmitted serially. In this example, at receipt (RX), lanes 0, 2, and 3 are aligned but the block 1 on lane 1 is the last arriving lane. For example, for 40 Gbps, 16,383 columns of 66-bit blocks are inserted on each PCS lane before a marker is inserted. The receipt of the markers on all lanes can be used to perform de-skew among the lanes.

Figure 8:
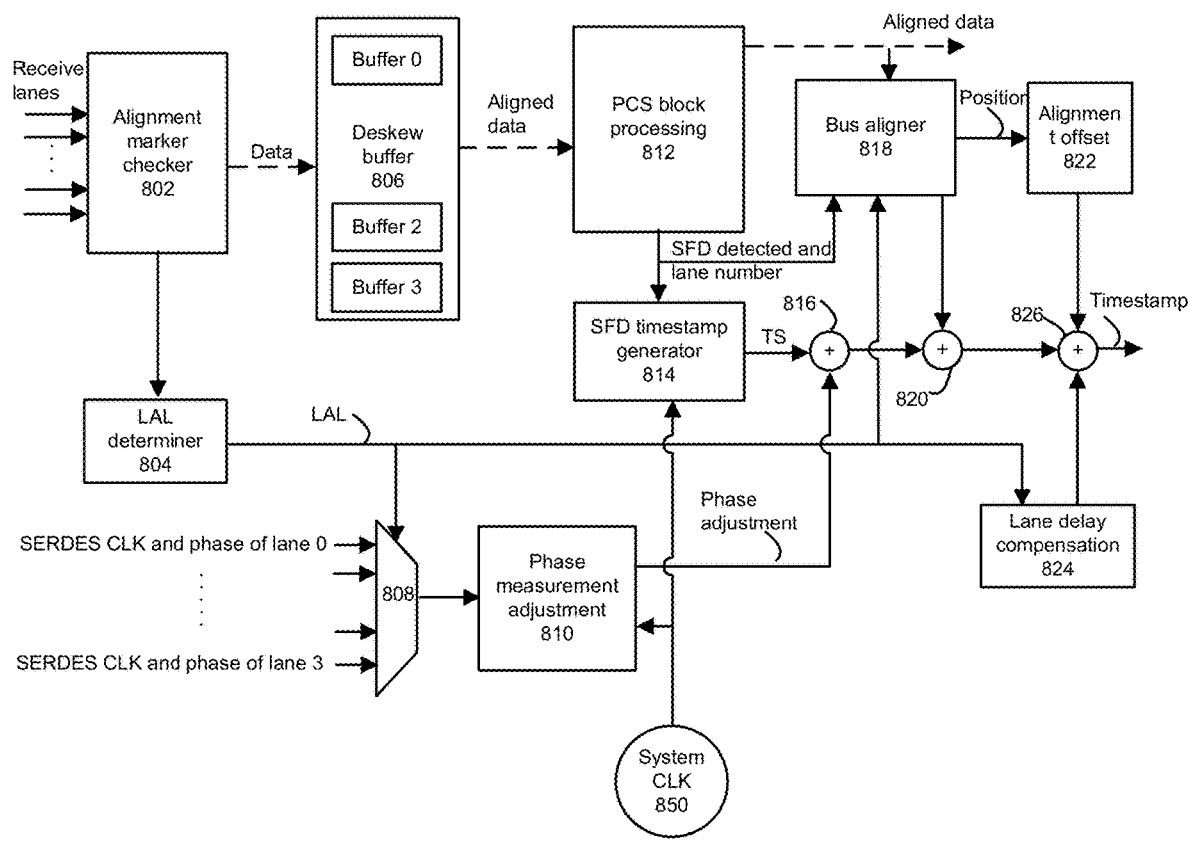
FIG. 8 depicts an example of a system that can be used to determine a time stamp of a received packet transmitted and received across multiple lanes.

FIG. 8 depicts an example of a system that can be used to determine a time stamp of a received packet transmitted and received across multiple lanes. The system can be positioned after the xMII interface and before MAC layer processing. The system can provide control signals to improve the time stamping accuracy of an SFD (or other trigger pattern or packet delimiter) by measuring and removing for errors arising from positioning an SFD within a combination of multiple lanes. The control signals can indicate a last arriving lane (LAL) and SFD (or other trigger pattern or packet delimiter) position within a group of blocks. The LAL control signal can change less frequently (for one or more packets) whereas the SFD control signal can change per packet.

Error conditions that are related to LAL include phase measurement of the LAL lane versus overall device timing and can remove a few nanoseconds of error. The LAL control signal can be used to choose one clock signal for passing to a single phase measurement adjustment device. Error conditions that are related to the SFD lane within multiple lanes are position of the 66 bit lane within the 264 bit processing bus, although other bit sizes can be used. A 264 bit processing bus can be used for 40 Gbps/100 Gbps lane processing. The 66 bit bus is part of the physical lane prior to aggregation into the 40 Gbps/100 Gbps high speed bus. The system can indicate which 66 bit physical lane the SFD is associated with. This can remove up to approximately 6 ns of time stamp error.

One or multiple receive lanes can provide blocks to alignment marker checker 802. Alignment marker checker 802 waits for all markers to arrive on all lanes. In some examples, alignment marker checker 802 can remove a marker from a lane and provide data to de-skew buffer 806. Alignment marker checker 802 indicates to LAL determiner 804 when a marker corresponding to a last arriving lane (LAL) is received (e.g., the last marker received in a group of markers). For example, for multiple lanes, if all markers are received at the same time, the LAL corresponds to any of the lanes. For a marker received on a particular lane after other markers on other lanes, that particular lane corresponds to the LAL. After the arrival of a last marker, for a next set of markers received on the lanes, the LAL can be updated.

With reference to the example of FIG. 7, blocks 0, 2, and 3 from respective lanes 0, 2 and 3 are aligned at receipt. However, block 1 on lane 1 has a different delay and arrives later. Alignment marker checker 802 waits for all markers (e.g., markers 0-3) to arrive to know relative delay among the lanes. Markers 0, 2, and 3 are received at the same time but marker 1 for lane 1 is delayed. De-skew buffer 806 buffers data from lanes 0, 2, and 3. When marker 1 for lane 1 arrives, de-skew buffer 806 releases all of blocks 0-3. In this example, lane 1 is identified as the LAL.

Referring again to FIG. 8, last arriving lane (LAL) determiner 804 outputs LAL lane number. For the example of FIG. 7, LAL is lane 1. The LAL can be used to select a SERDES recovered clock signal (shown as SERDES CLK) from recovered clock signals among all lanes. A clock and data recovery device can be used to recover data from a signal received on a lane. For example, the recovered clock signal can be generated from a frequency of a received data signal on a lane by a PMA or PCS (not shown). The recovered clock signal can be different from that of the chip clock domain (system clock (CLK) 850). For example, for four lanes, recovered clock signals from received data from lanes 0 to 3 are provided to multiplexer 808. In addition to recovered clock signals, for each lane, control signals are provided that indicate phase timing pulse for a beginning of packet. Multiplexer 808 will allow passthrough of a recovered clock signal and control signals corresponding to the LAL.

Phase measurement adjuster 810 can determine a phase offset between a recovered clock signal and system clock signal from system CLK 850. In some embodiments, a single instance or device phase measurement adjuster 810 is used regardless of the number of lanes. Phase measurement adjuster 810 can perform phase measurement relative to system clock and output a representation of a percentage period offset between the recovered clock signal and system clock. The output phase relationship can be used to fine tune offset between the recovered clock signal and the system clock. In some cases, the system clock frequency can be much higher in frequency that a frequency of the recovered clock signal. Techniques described with respect to "TECHNOLOGIES FOR HIGH-PRECISION TIME STAMPING OF PACKETS," inventors Southworth et al, filed Apr. 7, 2017, publication WO2018/186876 (P113218PCT), can be used to determine a phase adjustment between recovered clock signal and system clock signal. For example, phase measurement adjuster 810 determines a variable latency that occurs due to a phase difference between the system clock and recovered clock signal. Since the system clock signal and recovered clock signal are not locked to each other, there is not a definite relationship between the phases of the two clocks. Phase measurement adjuster 810 determine the phase difference of the recovered clock signal relative to the system clock signal. A time counter can be used that is updated each clock cycle and the time counter has an error of a fraction of a clock cycle of the corresponding clock at any given time, and the error is minimized immediately after the time counter is updated, which occurs at an edge of the corresponding clock signal. Phase measurement adjuster 810 may determine a phase difference between the recovered clock signal and the system clock signal by monitoring the difference between the time counter corresponding to the clock signals. Phase measurement adjuster 810 may extrapolate the current phase difference between the corresponding clock signals based on the known frequencies of the two clock signals. Other approaches for estimating the phase between two clock signals may be used, which may or may not depend on determining the difference between two time counters.

Given that the phase measurement scheme measures the difference between the SERDES clock phase and the system clock phase, the two could be off by up to a period of the system clock. For example, a system clock frequency can be 800 MHz (period of 1.25 ns). The phase measurement scheme can break this 1.25 ns phase into 16 segments, each being 1.25 ns/16. The final result is based on when the SFD occurs and the position of the SERDES clock relative to the 800 MHz clock. The result will be one of 16 phases. If, for example, the SFD occurs in phase #2, then (1.25/16)^2 will be an adjustment amount (subtracted in receive direction) from the timestamp value.

PCS block processing 812 receives aligned data from multiple lanes from de-skew buffer 806. Aligned data can be data from multiple lanes that are released at the same time whereby all lanes are released at the same time with the data from the LAL. PCS block processing 812 can detect an SFD and indicate that an SFD is detected by outputting signal SFD detected. SFD time stamp generator 814 can determine a time stamp at which the SFD is indicated as detected and output time stamp (TS) corresponding to approximately when the SFD is detected. The appearance of the SFD marker is relative to a recovered clock signal from received data. However, SFD time stamp generator 814 generates an intermediate time stamp value using (e.g., 64, 96, or other value) bit counter based on indication SFD detected relative to system clock signal from system CLK 850.

The SFD is detected in the PMA/PCS time domain and phase adjustment is used to bring the SFD into the system clock domain. First summer 816 receives a time stamp corresponding to the SFD detection time from SFD time stamp generator 814 and adjusts the time stamp based on the phase adjustment signal from phase measurement adjustment 810. The phase adjustment signal can be represented as a time stamp offset and can be subtracted from the SFD time stamp.

Bus aligner 818 can receive an indication that an SFD was detected and a lane number on which the SFD was detected. Bus aligner 818 can receive inputs of a lane number where an SFD occurred and an indication of a last arriving lane number. Bus aligner 818 can perform alignment of 66 bit blocks to a 264 bit bus, although other bit sizes can be used. Bus aligner 818 can identify an SFD location in a 66 bit block (e.g., lane) of a 264 bit bus and indicate the block in a position[ 1:0] output. For larger sized buses, the 66 bit block position in a bus can use additional position bits to track the location of a 66 bit block. Bus aligner 818 can output a position of SFD in a 66 bit block (e.g., position 0-65).

An example manner to determine number of counter values to use to adjust time stamp based on SFD position in block can be as follows. For a receive side, the following relationship can be determined: receive latency=(136+X) UI+80 ps=Z nanoseconds, where UI=0.97 picoseconds, X is the value from 0-65 that is obtained from this register. Then the final value in picoseconds is subtracted from the receive timestamp.

The time stamp may reflect that an SFD occurred at the end of a 66 bit block but the position of the SFD can be anywhere in the 66 bit block. Accordingly, the SFD time stamp may not accurately reflect the position of an SFD. The position of SFD in a 66 bit block can be used to adjust the time stamp of the SFD to account for an actual position of the SFD within a 66 bit block. Other sizes of blocks can be used. Second summer 820 can adjust SFD time stamp by subtracting a position of an SFD in a 66 bit block using the position of SFD from bus aligner 818.

After a block with an SFD is combined with other blocks for multiple parallel block output for example to a bus, alignment offset 822 can adjust an SFD time stamp for a lane number on which an SFD occurred. Signal "position" can indicate a lane number in which an SFD is positioned. For example, for 4 lanes combined into a single output, signal position can be 2 bits to indicate one of four lanes on which the SFD was received. Alignment offset 822 can output a time stamp adjustment value by considering a position of an SFD within a combination of lanes. For example, if signal position indicates lane 0 carries the SFD, then a time stamp offset is 0. If signal position indicates lane 1 carries the SFD, then a time stamp offset is a time stamp counter equivalent to +66 bits. If signal position indicates lane 2 carries the SFD, then a time stamp offset is time stamp counter equivalent to +132 bits. If signal position indicates lane 3 carries the SFD, then a time stamp offset is time stamp counter equivalent to +198 bits. Accordingly, time stamp accuracy can be improved to account for converting multiple blocks for output on a 264 bit bus.

An example manner to determine number of counter values to use to adjust time stamp based on position number of block in 264 bit bus is as follows. Receive latency=(136+ X+Y)UI+80 picoseconds=Z nanoseconds, where UI=0.97 picoseconds, Y is the value obtained from a look up table. The four values in the look up table could be: 0, 66UI, 128UI, 192UI, for example. Then the final value in picoseconds is subtracted from the receive timestamp.

Lane delay compensation 824 can compensate for fixed SERDES lane delay. SERDES lane delay can be provided by a manufacturer of the SERDES and stored in lane delay compensation 824. The delay can be a fixed value based on a LAL number.

Third summer 826 can adjust the time stamp to compensate for SERDES lane (e.g., PMA/PCS) delay based on an output from lane delay compensation 824. Third summer 826 can output a final time stamp value.

Figure 9A:
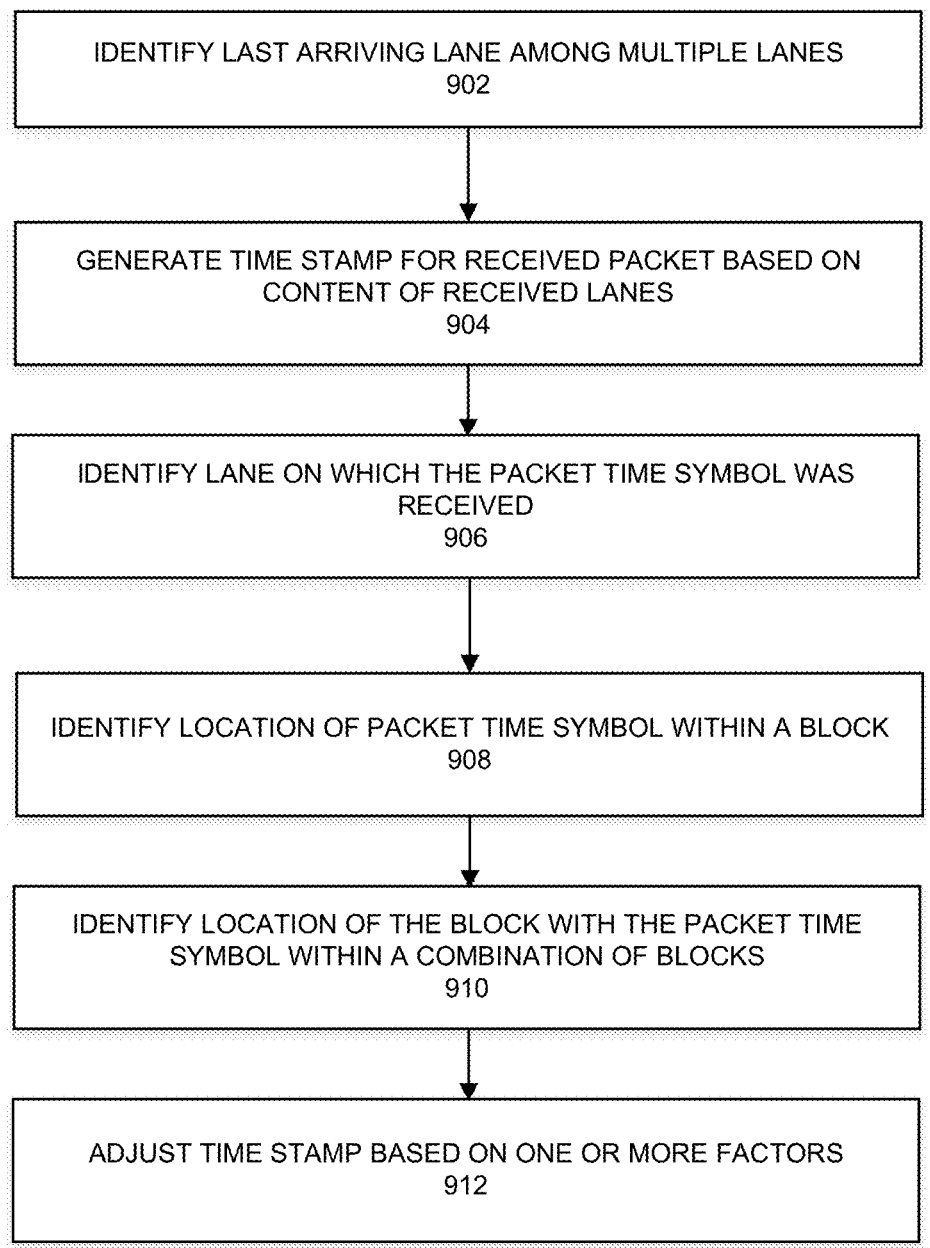

FIG. 9A depicts an example process. The process can be performed at a receiver of a packet or frame using multiple lanes. At 902, a last lane among multiple lanes of blocks is received and the last arriving lane is identified. The last lane can be received among multiple lanes where lanes convey portions of a packet or frame. The last lane arriving lane can be identified by the detection of a marker that is received after markers provided in other lanes. At 904, a time stamp corresponding to when a packet time symbol is identified is generated. The packet time symbol can be an SFD or end of frame indicator. At 906, the lane on which the packet time symbol is received is identified. At 908, a location of the packet time symbol within a block can be identified. For example, if a 66 bit block is used to convey a packet time symbol, the bit position of the start of the packet time symbol can be identified. At 910, a location can be identified of a block that includes the packet time symbol within a combination of other blocks. For example, a block can include the packet time symbol and multiple 66 bit blocks can be combined into a 264 bit output to a bus. At 912, the time stamp can be adjusted based on one or more of: phase offset between the recovered clock signal and a system clock signal, position of packet time symbol within a block of data, packet time symbol position within a multi-block segment, or last arriving lane serializer/de-serializer time delay. Action 912 can include one or more of actions 914, 916, 918, or 920.

FIG. 9B depicts an example of one or more actions that can be performed by 912. At 914, the time stamp of the packet time symbol can be adjusted based on a determined phase adjustment offset between the recovered clock signal from a signals received on the last arriving lane and the system clock signal. A single phase measurement device can be used despite multiple recovered clock signals for multiple lanes being available. At 916, the time stamp of the packet time symbol can be adjusted based on a position of the packet time symbol within a block. At 918, the time stamp of the packet time symbol can be adjusted based on a position of the block with the packet time symbol within a group of blocks. For example, if a block is combined with other blocks, the position of the block with the packet time symbol can be used to determine a time stamp adjustment. For example, if a 66 bit block is combined with other 66 bit blocks to form a 264 bit output, the position of the block can be identified and used to adjust the time stamp. At 920, the time stamp of the packet time symbol can be adjusted based on a time delay associated with the serializer/de-serializer used by the last arriving lane. A last arriving lane indicator can be used to determine the time delay from a look-up table.

Figure 10:
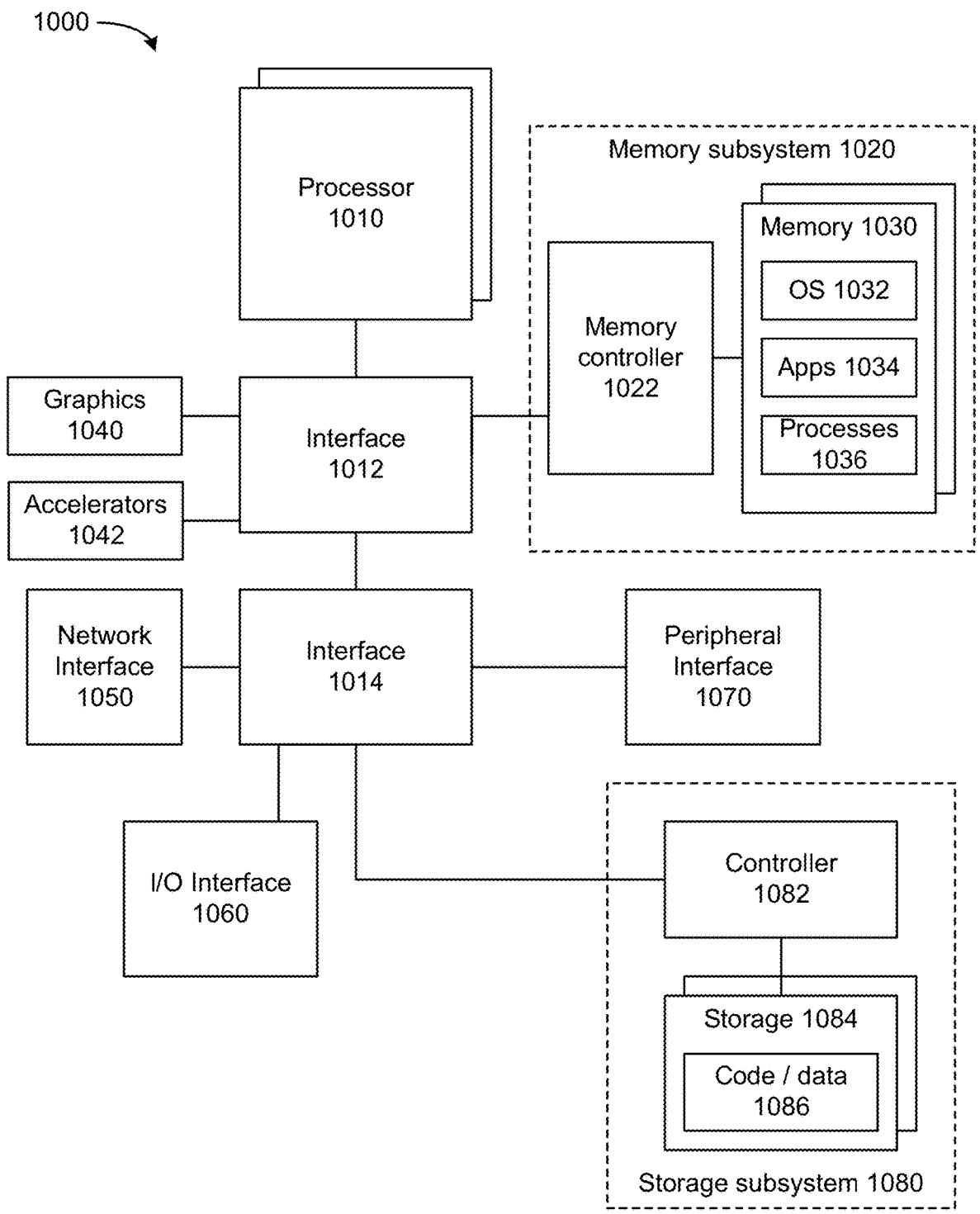
FIG. 10 depicts a system.

FIG. 10 depicts a system. The system can use embodiments described herein to perform time stamp measurement or adjustment in connection with packet transmission or receipt. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function offload engine that can be accessed or used by a processor 1010. For example, an accelerator among accelerators 1042 can provide compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1042 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a remote device, which can include sending data stored in memory. Network interface 1050 can receive data from a remote device, which can include storing received data into memory. Various embodiments can be used in connection with network interface 1050, processor 1010, and memory subsystem 1020.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (i.e., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (i.e., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects can be used such as PCIe, Ethernet, or optical interconnects (or a combination thereof).

Embodiments may be implemented in various types of computing and networking equipment, such as switches, routers, racks, and blade servers such as those employed in a data center and/or server farm environment. Servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 11:
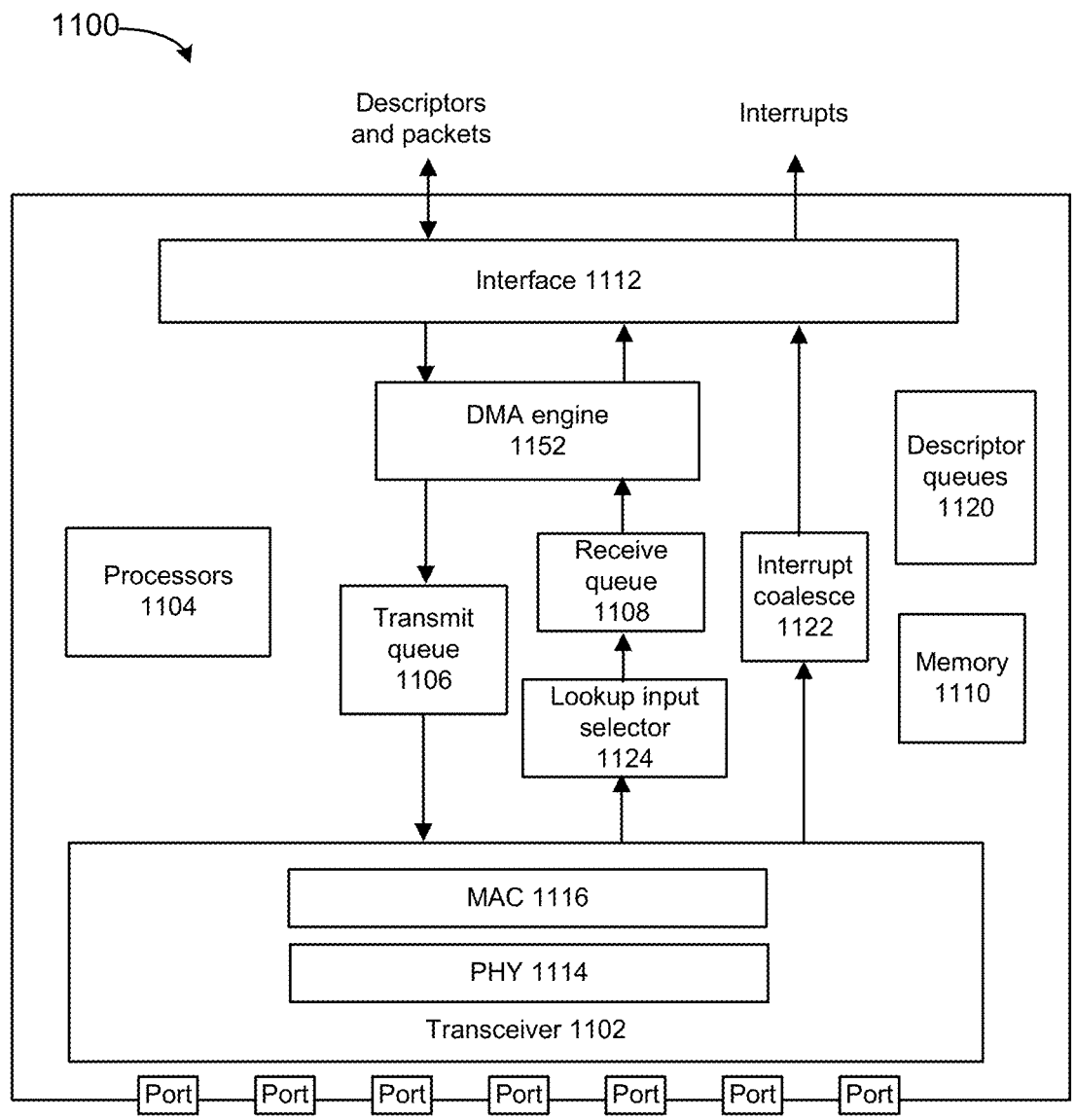
FIG. 11 depicts a network interface.

FIG. 11 depicts a network interface that can use embodiments or be used by embodiments to perform time stamp measurement or adjustment. Network interface 1100 can include transceiver 1102, processors 1104, transmit queue 1106, receive queue 1108, memory 1110, and bus interface 1112, and DMA engine 1152. Transceiver 1102 can be capable of receiving and transmitting packets in conformance with the applicable protocols such as Ethernet as described in IEEE 802.3, although other protocols may be used. Transceiver 1102 can receive and transmit packets from and to a network via a network medium (not depicted). Transceiver 1102 can include PHY circuitry 1114 and media access control (MAC) circuitry 1116. PHY circuitry 1114 can include encoding and decoding circuitry (not shown) to encode and decode data packets according to applicable physical layer specifications or standards. MAC circuitry 1116 can be configured to assemble data to be transmitted into packets, that include destination and source addresses along with network control information and error detection hash values. Processors 1104 can be any a combination of a: processor, core, graphics processing unit (GPU), field programmable gate array (FPGA), application specific integrated circuit (ASIC), or other programmable hardware device that allow programming of network interface 1100. For example, a "smart network interface" can provide packet processing capabilities in the network interface using processors 1104.

Packet allocator 1124 can provide distribution of received packets for processing by multiple CPUs or cores using timeslot allocation described herein or RSS. When packet allocator 1124 uses RSS, packet allocator 1124 can calculate a hash or make another determination based on contents of a received packet to determine which CPU or core is to process a packet.

Interrupt coalesce 1122 can perform interrupt moderation whereby network interface interrupt coalesce 1122 waits for multiple packets to arrive, or for a time-out to expire, before generating an interrupt to host system to process received packet(s). Receive Segment Coalescing (RSC) can be performed by network interface 1100 whereby portions of incoming packets are combined into segments of a packet. Network interface 1100 provides this coalesced packet to an application.

Direct memory access (DMA) engine 1152 can copy a packet header, packet payload, and/or descriptor directly from host memory to the network interface or vice versa, instead of copying the packet to an intermediate buffer at the host and then using another copy operation from the intermediate buffer to the destination buffer.

Memory 1110 can be any type of volatile or non-volatile memory device and can store any queue or instructions used to program network interface 1100. Transmit queue 1106 can include data or references to data for transmission by network interface. Receive queue 1108 can include data or references to data that was received by network interface from a network. Descriptor queues 1120 can include descriptors that reference data or packets in transmit queue 1106 or receive queue 1108. Bus interface 1112 can provide an interface with host device (not depicted). For example, bus interface 1112 can be compatible with PCI, PCI Express, PCI-x, Serial ATA, and/or USB compatible interface (although other interconnection standards may be used).

Figure 12:
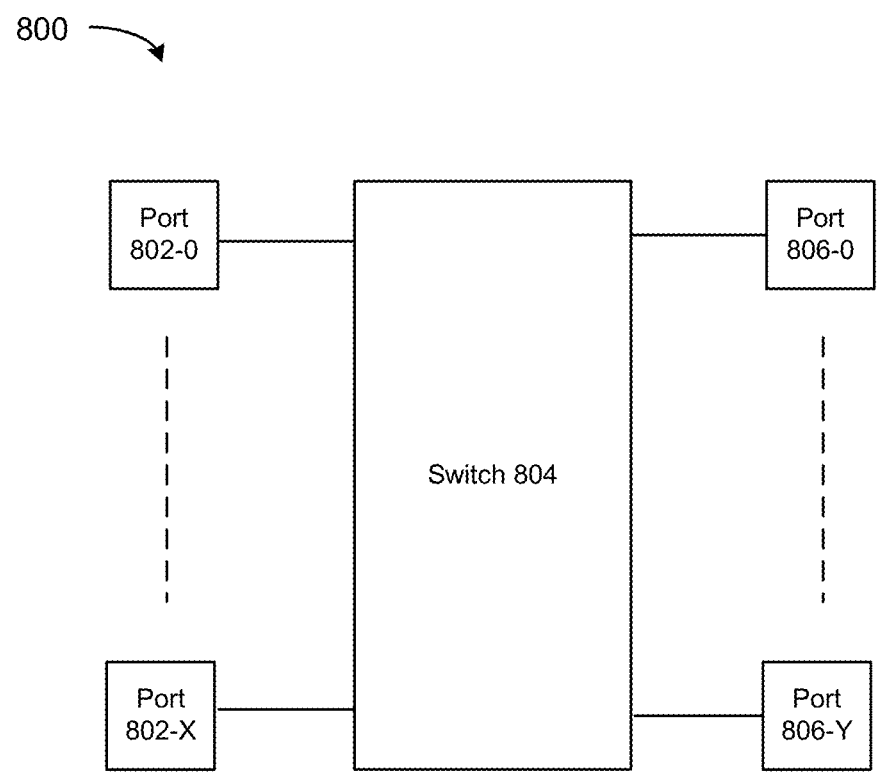
FIG. 12 depicts a switch.

FIG. 12 depicts a switch. Various embodiments can be used in or with the switch of FIG. 12 to perform time stamp measurement or adjustment. Switch 1204 can route packets or frames of any format or in accordance with any specification from any port 1202-0 to 1202-X to any of ports 1206-0 to 1206-Y (or vice versa). Any of ports 1202-0 to 1202-X can be connected to a network of one or more interconnected devices. Similarly, any of ports 1206-0 to 1206-X can be connected to a network of one or more interconnected devices. Switch 1204 can decide which port to transfer packets or frames to using a table that maps packet characteristics with an associated output port. In addition, switch 1204 can perform packet replication for forwarding of a packet or frame to multiple ports and queuing of packets or frames prior to transfer to an output port.

Figure 13:
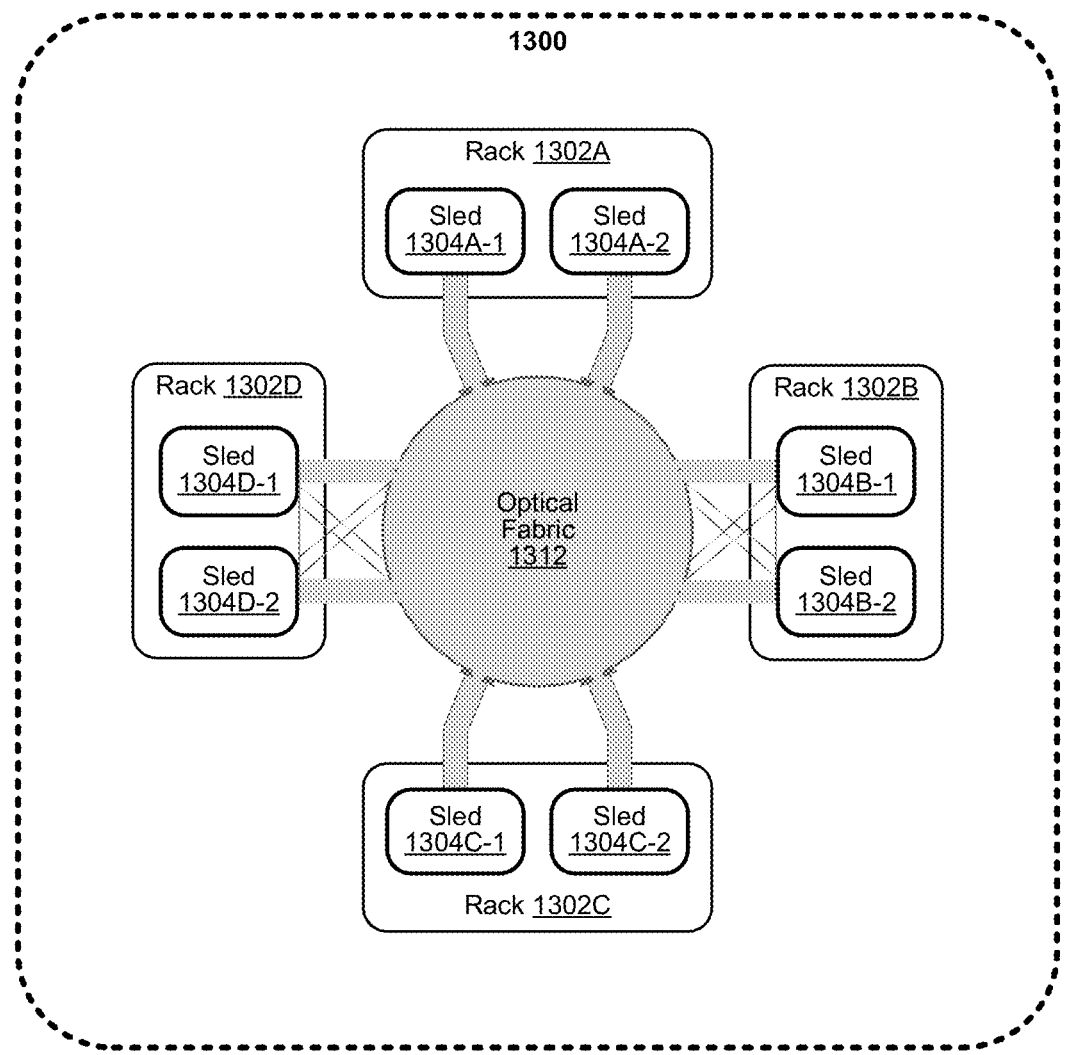
FIG. 13 depicts an example of a data center.

FIG. 13 depicts an example of a data center. Various embodiments can be used in or with the data center of FIG. 13 to perform time stamp measurement or adjustment for packet transmission or receipt. As shown in FIG. 13, data center 1300 may include an optical fabric 1312. Optical fabric 1312 may generally include a combination of optical signaling media (such as optical cabling) and optical switching infrastructure via which any particular sled in data center 1300 can send signals to (and receive signals from) the other sleds in data center 1300. However, optical, wireless, and/or electrical signals can be transmitted using fabric 1312. The signaling connectivity that optical fabric 1312 provides to any given sled may include connectivity both to other sleds in a same rack and sleds in other racks. Data center 1300 includes four racks 1302A to 1302D and racks 1302A to 1302D house respective pairs of sleds 1304A-1 and 1304A-2, 1304B-1 and 1304B-2, 1304C-1 and 1304C-2, and 1304D-1 and 1304D-2. Thus, in this example, data center 1300 includes a total of eight sleds. Optical fabric 1312 can provide sled signaling connectivity with one or more of the seven other sleds. For example, via optical fabric 1312, sled 1304A-1 in rack 1302A may possess signaling connectivity with sled 1304A-2 in rack 1302A, as well as the six other sleds 1304B-1, 1304B-2, 1304C-1, 1304C-2, 1304D-1, and 1304D-2 that are distributed among the other racks 1302B, 1302C, and 1302D of data center 1300. The embodiments are not limited to this example. For example, fabric 1312 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes a physical layer processing apparatus comprising: at least one physical medium attachment and physical coding sublayer device to receive a packet from multiple lanes of signals and provide the packet and associated recovered clock signal, wherein a start of frame delimiter (SFD) is received from one of the multiple lanes and a time stamp adjuster to: determine a time stamp associated with the received packet; adjust the time stamp based on the SFD position within a block of data received on one of the lanes and one or more of: phase offset between the recovered clock signal and a system clock signal, SFD position within a multi-block segment, or serializer/deserializer time delay; and provide the adjusted time stamp as an output.

Example 2 includes an apparatus of any example, wherein to adjust the time stamp based on the phase offset between the recovered clock signal and a system clock, the time stamp adjuster is to: determine a last arriving lane that provides a portion of the packet; determine a phase offset between the recovered clock signal from the last arriving lane and the system clock signal; and adjust a time stamp of the SFD based on the phase offset.

Example 3 includes an apparatus of any example and comprising a single phase measurement adjustment device for use to determine a phase offset between the system clock signal and recovered clock signals associated with multiple physical medium attachment and physical coding sublayer devices.

Example 4 includes an apparatus of any example and comprising a multiplexer to select a recovered clock signal from multiple physical medium attachment and physical coding sublayer devices based on a last arriving lane.

Example 5 includes an apparatus of any example, wherein to adjust the time stamp based on the SFD position within a block of data, the time stamp adjuster is to: determine a position of the SFD within the block of data and adjust the time stamp by a difference from a start of the block to the position of the SFD within the block of data.

Example 6 includes an apparatus of any example, wherein to adjust the time stamp based on the SFD position within a multi-block segment, the time stamp adjuster is to: determine a position of a block that includes the SFD within a multi-block bus output and adjust the time stamp by a difference from a start of the multi-block bus output and the block that includes the SFD.

Example 7 includes an apparatus of any example and comprising a bus aligner to indicate a block number of the block that includes the SFD within the multi-block bus output, wherein the time stamp adjuster is to determine the position of the block that includes the SFD within a multi-block bus output based on the block number.

Example 8 includes an apparatus of any example and comprising a network interface coupled to one or more of a server, data center, blade, rack, or host computer.

Example 9 includes a method for adjusting a time stamp of a packet, the method comprising: receiving recovered clock signals from multiple lanes of signals, the multiple lanes of signals providing a packet; determining a last arriving lane from the multiple lanes; determining a time stamp for the packet based on a start of frame indicator within a lane; providing a parallel combination of data received on the lanes; and adjusting the time stamp to account for a position of the start of frame indicator in the parallel combination of data.

Example 10 includes a method of any example, wherein: providing a parallel combination of data received on the lanes comprises providing the parallel combination to a bus interface and adjusting the time stamp to account for a position of the start of frame indicator in the parallel combination of data comprises adjusting the time stamp to account for a lane number of a lane that includes the start of frame indicator.

Example 11 includes a method of any example and comprising providing a lane number indication of a lane that included the start of frame indicator.

Example 12 includes a method of any example, wherein the start of frame indicator comprises a start of frame delimiter (SFD) compatible with IEEE 1588-2008.

Example 13 includes a method of any example and comprising selecting a recovered clock signal based on the last arriving lane and adjusting the time stamp to reduce phase offset between a system clock signal and the selected recovered clock signal associated with the last arriving lane.

Example 14 includes a method of any example and comprising adjusting the time stamp to account for a position of the start of frame indicator within a block of data.

Example 15 includes a method of any example and comprising selecting a recovered clock signal based on the last arriving lane and adjusting the time stamp to account for serializer/de-serializer time delay for the last arriving lane.

Example 16 includes a method of any example, wherein the packet comprises an Ethernet frame compatible with IEEE 802.3-2018.

Example 17 includes a system comprising: a computing platform comprising one or more processors and one or more memory devices and a network interface communicatively coupled to the computing platform, the network interface comprising: a clock recovery device to recover a clock signal from a signal received on a lane; an alignment marker checker to determine a last arriving lane among multiple lanes; a time stamp determination device to determine a time stamp of a received packet from among data received on multiple lanes; and a time stamp correction device to adjust the time stamp based on one or more of: phase offset between the recovered clock signal and a system clock signal, packet start indicator position within a block of data, packet start position within a multi-block segment, or serializer/de-serializer time delay, wherein the time stamp correction device is to provide the adjusted time stamp as an output.

Example 18 includes a system of any example, wherein the time stamp determination device is to determine the time stamp based on a start of frame delimiter (SFD).

Example 19 includes a system of any example, wherein to adjust the time stamp based on a packet start position within a multi-block segment, the time stamp correction device is to: determine a position of a block within a multi-block bus output and adjust the time stamp by a difference from a start of the multi-block bus output and a block that includes the packet start indicator.

Example 20 includes a system of any example, wherein the adjusted time stamp is to provide sub-nanosecond time stamp accuracy.

What is claimed is:

1. A physical layer processing apparatus comprising:
at least one physical medium attachment and physical coding sublayer device to receive a packet from multiple lanes of signals and provide the packet and associated recovered clock signal, wherein a start of frame delimiter (SFD) is received from one of the multiple lanes and a time stamp adjuster to:
determine a time stamp associated with the received packet;
adjust the time stamp based on a position of the SFD within a block of data received on one of the multiple lanes and one or more of: phase offset between the recovered clock signal and a system clock signal, the position of the SFD within a multi-block segment, or serializer/de-serializer time delay; and
provide the adjusted time stamp as an output.

2. The apparatus of claim 1, wherein to adjust the time stamp based on the phase offset between the recovered clock signal and a system clock, the time stamp adjuster is to:
determine a last arriving lane that provides a portion of the packet;
determine a phase offset between the recovered clock signal from the last arriving lane and the system clock signal; and
adjust a time stamp of the SFD based on the phase offset.

3. The apparatus of claim 2, comprising a single phase measurement adjustment device to determine a phase offset between the system clock signal and recovered clock signals associated with multiple physical medium attachment and physical coding sublayer devices.

4. The apparatus of claim 3, comprising a multiplexer to select a recovered clock signal from multiple physical medium attachment and physical coding sublayer devices based on a last arriving lane.

5. The apparatus of claim 1, wherein to adjust the time stamp based on the SFD position within a block of data, the time stamp adjuster is to:
determine a position of the SFD within the block of data and
adjust the time stamp by a difference from a start of the block of data to the position of the SFD within the block of data.

6. The apparatus of claim 1, wherein to adjust the time stamp based on the SFD position within a multi-block segment, the time stamp adjuster is to:
determine a position of a block that includes the SFD within a multi-block bus output and
adjust the time stamp by a difference from a start of the multi-block bus output and the block that includes the SFD.

7. The apparatus of claim 6, comprising a bus aligner to indicate a block number of the block that includes the SFD within the multi-block bus output, wherein the time stamp adjuster is to determine the position of the block that includes the SFD within a multi-block bus output based on the block number.

8. The apparatus of claim 1, comprising a network interface coupled to one or more of a server, data center, blade, rack, or host computer, wherein the network interface is to process the received packet and provide the processed received packet for access by the one or more of a server, data center, blade, rack, or host computer.

9. A method for adjusting a time stamp of a packet, the method comprising:
receiving recovered clock signals from multiple lanes of signals, the multiple lanes of signals providing a packet;
determining a last arriving lane from the multiple lanes;
determining a time stamp for the packet based on a start of frame indicator position within a lane;
providing a parallel combination of data received on the lanes; and
adjusting the time stamp to account for a position of the start of frame indicator in the parallel combination of data.

10. The method of claim 9, wherein:
providing a parallel combination of data received on the multiple lanes comprises providing the parallel combination to a bus interface and
adjusting the time stamp to account for a position of the start of frame indicator in the parallel combination of data comprises adjusting the time stamp to account for a lane number of a lane that includes the start of frame indicator.

11. The method of claim 10, comprising:
providing a lane number indication of a lane that included the start of frame indicator.

12. The method of claim 9, wherein the start of frame indicator comprises a start of frame delimiter (SFD) compatible with IEEE 1588-2008.

13. The method of claim 9, comprising:
selecting a recovered clock signal based on the last arriving lane and
adjusting the time stamp to reduce phase offset between a system clock signal and the selected recovered clock signal associated with the last arriving lane.

14. The method of claim 9, comprising:
adjusting the time stamp to account for a position of the start of frame indicator within a block of data.

15. The method of claim 9, comprising:
selecting a recovered clock signal based on the last arriving lane and
adjusting the time stamp to account for serializer/de-serializer time delay for the last arriving lane.

16. The method of claim 9, wherein the packet comprises an Ethernet frame compatible with IEEE 802.3-2018.

17. A system comprising:
a computing platform comprising one or more processors and one or more memory devices and
a network interface communicatively coupled to the computing platform, the network interface comprising:
a clock recovery device to recover a clock signal from a signal received on a lane;
an alignment marker checker to determine a last arriving lane among multiple lanes;
a time stamp determination device to determine a time stamp of a received packet from among data received on multiple lanes; and
a time stamp correction device to adjust the time stamp based on packet start indicator position within a block of data and one or more of: phase offset between the recovered clock signal and a system clock signal, packet start position within a multi-block segment, or serializer/de-serializer time delay, wherein the time stamp correction device is to provide the adjusted time stamp as an output.

18. The system of claim 17, wherein the time stamp determination device is to determine the time stamp based on a start of frame delimiter (SFD).

19. The system of claim 17, wherein to adjust the time stamp based on a packet start indicator position within a multi-block segment, the time stamp correction device is to:
determine a position of a block within a multi-block bus output and adjust the time stamp by a difference from a start of the multi-block bus output and a block that includes the packet start indicator.

20. The system of claim 17, wherein the adjusted time stamp is to provide sub-nanosecond time stamp accuracy.

* * * * *